United States Patent Office 2,911,422
Patented Nov. 3, 1959

2,911,422

SYNTHESIS OF CARBOXYLIC ACIDS FROM OLEFINIC COMPOUNDS, CARBON MONOXIDE AND WATER IN THE PRESENCE OF A SOLVENT

Raffaele Ercoli, Monza, Italy, assignor to Societa Generale per l'Industria Mineraria e Chimica, a corporation of Italy No Drawing. Application May 23, 1956
Serial No. 586,639

Claims priority, application Italy May 28, 1955

18 Claims. (Cl. 260—413)

This invention relates to a new and improved method of synthesizing carboxylic acids from olefinic compounds, carbon monoxide and water in the presence of a solvent.

It is known that by reacting olefinic compounds with carbon monoxide and water with the aid of a catalyst comprising a metal of the eighth group of the periodic system, organic acids may be obtained on the basis of the following reaction scheme:

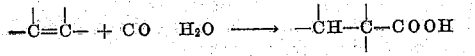  (I)

According to hitherto known processes, the synthesis is accomplished by reacting at temperatures generally between 200 and 350° C., under high carbon monoxide pressure and, optionally, in the presence of inert solvents, whereby the catalysts used are dissolved or suspended in the reacting mass. According to these prior methods, it did not seem possible that the reaction producing carboxylic acids could be carried out under milder temperature and pressure conditions, particularly at temperatures below 200° C. and under low pressures. If the attempt is made to operate under such milder conditions, the reaction either does not take place at all or proceeds at such low rates as to be practically useless for the commercial production of carboxylic acids.

On the other hand, it was found that, if the synthesis of these acids is carried out at the suggested temperatures, particularly above 190–200° C., side reactions of substantial magnitude often take place, such as the reaction $CO + H_2O \rightleftharpoons CO_2 + H_2$, whereby hydrogen is formed which reacts with carbon monoxide and olefine to give aldehydes, alcohols, ketones and other compounds derived therefrom. Therefore, in order to produce high acid yields at reduced plant and operating costs, the most desirable way of operating would be at low temperatures and pressures. The corrosion to which the equipment is exposed increases with higher operating temperatures, and the construction of acid-resistant high pressure equipment represents a serious economic burden.

I have now found that, if the reaction between the olefinic compound, water and carbon monoxide is carried out in the liquid phase of a solvent having a high solvent rate for the reactants (water and olefinic compound) as well as for the catalyst and the primary reaction product (carboxylic acid), it is possible to produce the acids with excellent yields and at a satisfactory conversion rate, by applying a relatively low carbon monoxide pressure (from 50 to 250 atm.) and much lower temperatures (100 to 190° C.) than those disclosed in the prior art. Particularly high yields and reaction rates are obtained if a proper solvent is used in such an amount as to assure a homogeneous liquid phase, that is, the existence of only one liquid phase in the reaction system. Furthermore I found that, if the reaction is carried out at the conventional temperature and pressure conditions while using the operating procedures outlined above, very satisfactory results are obtained, particularly as far as the conversion rate is concerned, although the yields are somewhat adversely affected by the occurrence of side reactions.

Moreover, I have observed that, when operating under the conditions of this invention, and particularly at temperatures below 190° C., a remarkable decrease in the reaction rate occurs if the carbon monoxide pressure is increased above 170–200 atm. From this point of view the present invention also differs clearly from the prior processes which, in general, adopt or advise the use of much higher carbon monoxide pressures.

It is, therefore, the primary object of the present invention to provide a new and improved process for the production of carboxylic acids according to reaction I, which, in short, consists in reacting an olefinic compound, water and carbon monoxide in the presence of a catalyst comprising a metal of the eighth group of the periodic system at temperatures between 100 and 190° C. and under carbon monoxide pressure of not more than 250 atm.; whereby the reaction is carried out in the presence of appropriate amounts of a suitable solvent, i.e. a solvent wherein the olefinic compound and water coexist dissolved at high concentration, whereby a single liquid phase is formed which also comprises a solution of the catalyst or, wherein the solvent, the reactants and the reaction products form a single liquid phase in the reactor. Since, generally, the mutual solubility of water and olefinic compounds (especially olefinic hydrocarbons) is very low, the solvents to be adopted for this process as of necessity must be not only excellent solvents for water and at least good solvents for the olefinic compound which is to be converted to carboxylic acid, but also good solvents for the reaction products, i.e. carboxylic acids.

Particularly suitable solvents from this point of view are ketones such as acetone, compounds with ether linkages such as dioxane or glycol dimethyl ether and substituted amides such as dimethyl formamide and formyl piperidine. Monohydric alcohols of low molecular weight, such as methyl, ethyl, isopropyl and n-propyl alcohol, may be used with good results but they cause reduced acid yields because they participate in parasitic reactions, such as the formation of the corresponding esters. On the other hand, the use of low molecular weight acids (such as, for example, formic acid, acetic acid, propionic acid, etc.) is inadvisable, because of the greater danger of corrosion of the equipment.

Completely unsuitable for carrying out the synthesis in question under the herein claimed conditions are solvents which do not possess a sufficient dissolving power for water, such as the various hydrocarbons, and those solvents, such as water and glycols, in which most olefinic compounds (and in particular the olefinic hydrocarbons) are insufficiently soluble. In fact, not only the choice of a suitable solvent but also the relative amount of solvent present has an intrinsic influence upon the course of the reaction so that in seemingly similar experiments surprisingly different results are obtained, depending upon whether the essential condition of a homogeneous liquid reacting phase is satisfied or not. Table 1, indicating the results of three experiments carried out under comparable conditions which will be described in detail further below, is particularly illustrative with respect to the foregoing.

TABLE 1

Synthesis of hexahydrobenzoic acid from cyclohexene, water and CO at 165° C. and in the presence of solvents. Cyclohexene used 41 g. dicobalt octacarbonyl 5 g.

| Example No. | Solvent | Water, g. | Pressure, atm. initial | Pressure, atm. final | Reaction Time, min. | Acid obtained, g. | mols $H_2O$ / mols $C_6H_{10}$ | $\dfrac{\text{Weight } H_2O + \text{weight } C_6H_{10}}{\text{weight of solvent}}$ |
|---|---|---|---|---|---|---|---|---|
| 1 | acetone, 100 g | 27 | 150 | 100 | 80 | 42 | 3 | 0.68 |
| 4 | acetone, 37 g | 108 | 165 | 163 | 120 | <1 | 12 | 4 |
| 1a | benzene, 112 g | 27 | 170 | 169 | 180 | <1 | 3 | 0.60 |

As will be seen from a comparison of the herein following Examples 1, 1a and 4, while it is possible to convert more than 73% of cyclohexene to hexahydrobenzoic acid within 80 minutes by using a sufficient amount of acetone as the solvent, the conversion is practically zero if under the same experimental conditions the acetone is replaced with benzene, or if an amount of acetone is used that is insufficient to produce a homogeneous liquid reaction phase.

Similarly, it is possible to convert 88% of propylene to butyric acid within 540 minutes at 120° C. (± 1°) and under a carbon monoxide pressure from 250 to 170 atm., provided a suitable solvent, such as dioxane, is used. However, the result is practically zero, even after a reaction time of 10 hours at 150–180° C., if no solvent is used. In fact, in this latter case any reaction is noted only at temperatures higher than 200° C. and the reaction product obtained comprises, contrary to the foregoing, a complex mixture in which, aside from butyric acids, appreciable amounts of high boiling esters and $C_7$-ketones are present.

In order to carry out the reaction under the required conditions of a single homogeneous liquid phase, aside from selecting a suitable reaction medium (solvent), it is also necessary to employ the solvent within definite ratio limits based on the weight and molar ratio of the reactants.

I have found that in order to obtain optimum conversion rates and yields of carboxylic acid, the ratio between mols of water and mols of unsaturated compound used (henceforth referred to as ratio A) must be higher than 1. Moreover, for every value of the ratio A there is an upper limit for the ratio between weight of water plus weight of unsaturated reactant and weight of solvent (henceforth referred to as ratio B). Consequently, the upper limit of ratio B or, expressed differently, the minimum amount of solvent necessary to assure single, homogeneous liquid reaction phases at various operating temperatures is determined by the selected value A and the weight of the charge (water and unsaturated reactant). Any increase in the B ratio beyond this limit causes the separation into two liquid phases formed by the same components at different weight ratios that are in equilibrium with each other. The difference in the composition of these phases is the more pronounced the higher the value of the B ratio is so that, beyond a certain point, the reaction system reverts back to prior conditions which, as previously set forth, are decidedly unfavorable for the synthesis of carboxylic acids.

It is obvious that, if for the B ratio a value is selected that is only slightly higher than the herein defined optimum limit, the synthesis of carboxylic acids is still possible since in this case the two separated phases do not have a very different composition. In order not to revert back to the prior, entirely unfavorable conditions, the value of B should not be equal to the value at which the liquid phase completely separates into two, but must be lower than that at which phase separation occurs. However, the B value may be lower than, equal to, or very slightly higher than, the optimum value.

The numerical value of B depends upon the temperature, the A ratio and the mutual solubilities of the components of the reaction system (water, olefine compound, solvent, catalyst, carbon monoxide and reaction products), whereby, as all other operating conditions are established, the value decreases when using unsaturated compounds of increasing molecular weight; i.e. unsaturated compounds of increasingly less solubility in water. For example, in the synthesis of hexahydrobenzoic acid from cyclohexene, water and carbon monoxide at 165° C., it has been found that, when using A values between 4 and 2, the maximum value of B must range from 0.5 to 1.5.

The reaction may be carried out by using as catalyst carbonyls of metals selected from the eighth group of the periodic table or salts of these metals which are capable of being converted to carbonyls under the reaction conditions. The salt of the metal with the organic acid which is to be produced was found to be particularly advantageous. This permits a simple recycling of the catalyst without the necessity of any conversion treatment and requires only the replacement of occasional losses, which are negligible. The preferred reaction temperatures range from 100 to 190° C. while the carbon monoxide pressure is held at less than 250 atm.

The catalyst concentration is primarily dictated by economic considerations, based on the metal as such. An amount of catalyst comprising 0.5 to 8 g. of metal per liter of reaction solution is generally preferred.

The process can be carried out as a batch process or continuously; in the latter case the solvent is completely recovered by distillation or rectification and recycling.

The process is further illustrated in the herein following examples, of which Examples 1a, 3a and 4, referring to reaction conditions outside of the scope of the present invention, are only presented for the purpose of comparison.

EXAMPLE 1

5 g. dicobalt octacarbonyl, 41 g. cyclohexene, 27 g. water, and 100 g. acetone are introduced into a stainless-steel shaking autoclave of 450 cc. capacity. The air is removed and 100 atm. of carbon monoxide are compressed into the autoclave which is then oscillated and heated rapidly to 165° C. Within 80 minutes of reaction at 165° C., the pressure drops from 148 to 100 atm. The autoclave is cooled, residual gas removed and the reaction products distilled, whereby a first fraction distilling up to 95° C. is collected which consists predominantly of acetone, cyclohexene (6 g.=14% of the olefine used) and water. The residue is acidified with hydrochloric acid and extracted with ether.

The ether extract is washed several times with water, dried with calcium chloride and distilled. After removal of the ether, in the fraction boiling between 120 and 126° C. at 15 mm., small amounts of tops consisting of hexahydrobenzaldehyde and 42 g. of hexahydrobenzoic acid are obtained. The conversion rate of olefine to hexahydrobenzoic acid is 73.5%. The yield is 86%.

EXAMPLE 1a

If the procedure of Example 1 is repeated at identical operating conditions except that, instead of acetone, benzene water-immiscible is used as solvent, the results are unsatisfactory. 100 atm. of carbon monoxide are compressed into the autoclave containing 5 g. dicobalt octacarbonyl, 41 g. cyclohexene, 27 g. water and 112 g. benzene. The autoclave is set in motion, heated to 165° C. and kept oscillating at this temperature for 180 minutes. Although the duration of this experiment is more than double that of Example 1, a pressure drop of only 2 atm. is noted. The crude reaction product contains only negligible amounts of high boiling products.

EXAMPLE 2

5 g. dicobalt octacarbonyl, 41 g. cyclohexene, 54 g. water, 77 g. acetone, and carbon monoxide producing a pressure of 128 atm. are introduced into the autoclave of the foregoing examples. The autoclave is set in motion, heated rapidly to 165° C. and kept oscillating at this temperature for 3 hours. The pressure drops from 198 to 142 atm. The autoclave is cooled rapidly, the gases are vented and the crude reaction product, amounting to 187 g., is withdrawn.

Acetone, residual cyclohexene (about 2 g.; 5% of the original charge), and water are removed by distillation at atmospheric pressure. Upon treating the distillation residue substantially as described in Example 1, 57 g. hexahydrobenzoic acid are obtained (conversion 89%; yield 93.5%).

EXAMPLE 3

7 g. dicobalt octacarbonyl, 100 g. water, 362 g. dioxane and 73 g. propylene are introduced into an autoclave of 2,000 cc. capacity. Carbon monoxide is compressed into the autoclave to a pressure of 180 atm. and the autoclave is set in motion and heated to 125° C. While maintaining the autoclave oscillating at this temperature for 9 hours, a pressure decrease from 308 to 227 atm. is noted. After cooling and venting the gases (propylene recovered about 3.5 g.; 5%) the reaction mixture is rectified at normal pressure, whereby all the water is removed as an azeotropic mixture with dioxane. From the residue, 135 g. of butyric and isobutyric acid are recovered by distillation. Conversion 88%, yield 93%.

EXAMPLE 3a

An experiment carried out under the same operating conditions, but without the use of any solvent fails to produce the desired result. No pressure drop is noted, even after 10 hours at temperatures between 120 and 180° C. The autoclave is heated to 205–210° C. for additional ten hours and a pressure drop of 150 atm. is noted. Amongst the organic products obtained, besides butyric acids, substantial amounts of $C_7$-ketone and $C_8$-esters, such as, for example, butyl butyrate, are identified.

EXAMPLE 4

This example is intended to show the very poor results obtained when using an excessive amount of water.

5 g. dicobalt octacarbonyl, 108 g. water, 41 g. cyclohexene and 37 g. acetone are introduced into a shaking autoclave of 450 cc. capacity. 100 atm. of carbon monoxide are compressed into the autoclave which is then set in motion and heated to 165° C. While keeping the autoclave at this temperature for 120 minutes, a pressure decrease from 165 to 163 atm. is noted. After cooling and removal of the gases, a crude product amounting to 188 g. and consisting of two separate liquid phases is recovered. The oily layer is separated and the aqueous phase is extracted with ether.

The ether extract and the initially separated oily layer are combined and treated with a small amount of HCl in order to separate the cobalt. The material is washed several times with small amounts of water, dried over calcium chloride and distilled at atmospheric pressure at temperatures up to 120° C. A small residue is left; it is distilled at reduced pressure whereby a fraction is obtained having a B.P. of 115–130° C. (15 mm.). This fraction amounts to 1.2 g. and contains 72% of hexahydrobenzoic acid.

EXAMPLE 5

5 g. dicobalt octacarbonyl, 56 g. 2-ethyl-1-hexene, 78 g. acetone and 26 g. water are introduced into a stainless steel shaking autoclave of 450 cc. capacity.

The autoclave is set in motion and carbon monoxide is introduced until a pressure of 196 atm. is attained, at a temperature of 16° C. The autoclave is heated rapidly to 165° C. and kept oscillating at this temperature for 210 minutes. After cooling and removal of the residual gases, the reaction product obtained is treated substantially as described in Example 1. By distillation at reduced pressure, a fraction weighing 55 g. is obtained; it contains small amounts of aldehydes, boils between 100 and 145° C. at 17 mm. Hg and consists to 87% of aliphatic acids having 9 carbon atoms (conversion 60%).

EXAMPLE 6

3 g. dicobalt octacarbonyl and a solution consisting of 44 g. crotonic acid, 38 g. water and 78 g. acetone and having an acidity number of 178 are introduced into a stainless steel autoclave of 450 cc. capacity. While keeping the autoclave in motion, carbon monoxide is compressed into it to a pressure of 89 atm. at 19° C. The autoclave is heated rapidly to 160° C. and kept at this temperature for 100 minutes while feeding carbon monoxide so that a total pressure between 145 and 135 atm. is constantly maintained. After cooling and removal of the gases, 165 g. of a liquid having an acidity number of 254 are obtained. Dicarboxylic acids containing 5 carbon atoms are isolated from the crude product by the usual methods.

EXAMPLE 7

57 g. acetone, 12 g. water, 1.5 g. dicobalt octacarbonyl and 20 g. of crude undecylenic acid having an equivalent weight of 186 are introduced into a stainless steel oscillating autoclave of 450 cc. capacity. Air is removed from the autoclave and carbon monoxide is compressed into it until, after oscillating, the pressure reaches 120 atm. at 20° C. The autoclave is heated rapidly to 145° C. and held at this temperature (± 2° C.) for 60 minutes, while pressure drops from 192 to 185 atm. After cooling and removal of the gases, the reaction mixture and the acetone-washing of the autoclave are distilled on a water bath until acetone is removed. The residue is treated with an excess of aqueous KOH, filtered from the precipitate, and the filtrate acidified with HCl. The organic acids thus precipitated are filtered, washed repeatedly with water and dried by prolonged heating at 80° C. under 1 mm. Hg pressure. The solid residue is dissolved in hot benzene, filtered, and the solvent partially evaporated. Thus 18 g. of dicarboxylic acids are obtained having an equivalent weight of 118. The conversion, on the basis of pure dodecandioic acids is 62%.

I claim:

1. In the process of producing carboxylic acids by reacting an oefinic compound, carbon monoxide and water in the presence of a catalyst taken from the group consisting of cobalt carbonyls and cobalt compounds capable of being converted to cobalt carbonyls under the conditions of the process, the improvement consisting in adding to the reactants an organic solvent having a high dissolving power for the olefinic compound, water, the catalyst and the resulting carboxylic acid, in an amount such that the reaction mass consists essentially of a homogeneous liquid phase containing the olefinic compound, water, the carboxylic acid formed, and the catalyst, the ratio between mols of water and mols of olefinic compound being greater than one, the ratio between weight of water plus weight of olefinic compound to weight of solvent being below that at which any substantial phase separation occurs, and heating to a temperature of 100° to 190° C. at a carbon monoxide pressure of 80 to 250 atm.

2. The process of claim 1, being carried out in a stainless steel pressure chamber.

3. A process for the production of butyric acids by reacting propylene with CO and water according to claim 1.

4. A process for the production of aliphatic acids with 9 carbon atoms by reacting octenes with CO and water according to claim 1.

5. A process for the production of hexahydrobenzoic acid by reacting cyclohexene with CO and water according to claim 1.

6. A process for the production of dicarboxylic acids by reacting crotonic acid with CO and water according to claim 1.

7. In the process of producing carboxylic acids by reacting an olefinic compound, carbon monoxide and water in the presence of a catalyst taken from the group consisting of cobalt carbonyls and cobalt compounds capable of being converted to cobalt carbonyls under the conditions of the process, the improvement consisting in adding to the reactants a solvent taken from the group of solvents consisting of acetone, dioxane, glycol dimethyl ether, dimethyl formamide, formyl piperidine and lower aliphatic alcohols, in an amount such that the reaction mass consists essentially of a homogeneous liquid phase containing the olefinic compound, water, the carboxylic acid formed, and the catalyst, the ratio between mols of water and mols of olefinic compound being greater than one, the ratio between weight of water plus weight of olefinic compound to weight of solvent being below that at which any substantial phase separation occurs, heating to a temperature of 100° to 190° C. at a carbon monoxide pressure of 80 to 250 atm., and continuing heating to said temperature until no more carboxylic acid forms.

8. A process according to claim 7, wherein the ratio between the sum of the weight of water plus the weight of the olefinic compound and the weight of solvent is within the range from 0.3 to 2.

9. A process according to claim 7, wherein the reaction is carried out in the presence of a single liquid phase containing the water and the olefinic compound in a molar ratio ranging from 1 to 6.

10. In the process of producing carboxylic acids by reacting an olefinic compound, carbon monoxide and water in the presence of a catalyst taken from the group consisting of cobalt carbonyls and cobalt compounds capable of being converted to cobalt carbonyls under the conditions of the process, the improvement consisting in adding to the reactants a lower aliphatic ketone having a high dissolving power for the olefinic compound, water, the catalyst and the resulting carboxylic acid, in an amount such that the reaction mass consists essentially of a homogeneous liquid phase containing the olefinic compound, water, the carboxylic acid formed, and the catalyst, the ratio between mols of water and mols of olefinic compound being greater than one, the ratio between weight of water plus weight of olefinic compound to weight of the said lower aliphatic ketone being below that at which any substantial phase separation occurs, and heating to a temperature of 100° to 190° C. at a carbon monoxide pressure of 80 to 250 atm.

11. The process of claim 10, being carried out in a stainless steel pressure chamber.

12. A process of making hexahydrobenzoic acid comprising reacting cyclohexene, water and carbon monoxide in the presence of dicobalt octacarbonyl catalyst, the reaction being carried out in acetone in an amount such that the reaction mass consists essentially of a homogeneous liquid phase containing the acetone, the cyclohexene, water, the carboxylic acid formed, and the catalyst, the reaction mixture being shaken during the reaction, the ratio between mols of water and mols of cyclohexene being between 4 and 2, the maximum value of the ratio between weight of water plus weight of cyclohexene to weight of acetone ranging from 0.5 to 1.5, and heating at about 165° C. at a carbon monoxide pressure of 80 to 250 atm.

13. A process of making hexahydrobenzoic acid comprising reacting cyclohexene, water and carbon monoxide in the presence of dicobalt octacarbonyl catalyst, the reaction being carried out in acetone in an amount such that the reaction mass consists essentially of a homogeneous liquid phase containing the acetone, the cyclohexene, water, the carboxylic acid formed, and the catalyst, the reaction mixture being shaken during the reaction, the ratio between mols of water and mols of cyclohexene being greater than one, the ratio between weight of water plus weight of cyclohexene to weight of acetone being lower than that at which any substantial phase separation occurs, and heating to a temperature of 100° to 190° C. at a carbon monoxide pressure of 80 to 250 atm.

14. A process of making hexahydrobenzoic acid comprising reacting cyclohexene, water, and carbon monoxide in the presence of dicobalt octacarbonyl catalyst, the reaction being carried out in acetone in an amount such that the reaction mass consists essentially of a homogeneous liquid phase containing the acetone, the cyclohexene, water, the carboxylic acid formed, and the catalyst, the reaction mixture being shaken during the reaction, the ratio between mols of water and mols of cyclohexene being greater than one, the maximum ratio of weight of the water plus cyclohexene to the acetone being about 1.5, and heating to a temperature of 100° to 190° C. at a carbon monoxide pressure of 80 to 250 atm.

15. A process of making an aliphatic carboxylic acid having nine carbon atoms, comprising reacting an octene, water and carbon monoxide in the presence of dicobalt octacarbonyl catalyst, the reaction being carried out in acetone in an amount such that the reaction mass consists essentially of a homogeneous liquid phase containing the acetone, the octene, water, the carboxylic acid and the catalyst, the reaction mixture being shaken during the reaction, the ratio between mols of water and mols of the octene being greater than one, the ratio between weight of water plus weight of octene to weight of acetone being lower than that at which any substantial phase separation occurs, and heating to a temperature of 100° to 190° C. at a carbon monoxide pressure of 80 to 250 atm.

16. A process of making a dicarboxylic acid having five carbon atoms, comprising reacting crotonic acid, water and carbon monoxide in the presence of dicobalt octacarbonyl catalyst, the reaction being carried out in acetone in an amount such that the reaction mass consists essentially of a homogeneous liquid phase containing the acetone, the crotonic acid, water, the dicarboxylic acid formed, and the catlyst, the reaction mixture being shaken during the reaction, the ratio between mols of water and mols of crotonic acid being greater than one, the ratio between weight of water plus weight of crotonic acid to weight of acetone being lower than that at which any substantial phase separation occurs, and heating at about 165° C. at a carbon monoxide pressure of 80 to 250 atm.

17. A process of making an aliphatic dicarboxylic acid comprising reacting undecylenic acid, water and carbon monoxide in the presence of dicobalt octacarbonyl catalyst, the reaction being carried out in an amount of acetone such that the reaction mass consists essentially of a homogeneous liquid phase containing the acetone, the undecylenic acid, water, the dicarboxylic acid formed, and the catalyst, the reaction mixture being shaken during the reaction the ratio between mols of water and mols of undecylenic acid being greater than one, the ratio between weight of water plus weight of undecylenic acid to weight of acetone being lower than that at which any substantial phase separation occurs, and heating to a temperature of 100° to 190° C. at a carbon monoxide pressure of 80 to 250 atm.

18. A process of making a butyric acid comprising reacting propylene, water and carbon monoxide in the presence of dicobalt octacarbonyl catalyst, the reaction being carried out in an amount of dioxane such that the reaction mass consists essentially of a homogeneous liquid phase containing the dioxane, the propylene, water, the butyric acid formed, and the catalyst, the reaction mixture being shaken during the reaction, the ratio between mols of water and mols of propylene being greater than one, the ratio between weight of water plus weight of propylene to weight of dioxane being lower than that at which any substantial phase separation occurs, and heating to a temperature of 100° to 190° C. at a carbon monoxide pressure of 80 to 250 atm.

References Cited in the file of this patent

UNITED STATES PATENTS

| | | |
|---|---|---|
| 2,448,368 | Gresham et al. | Aug. 31, 1948 |
| 2,604,490 | Reppe | July 22, 1952 |
| 2,710,878 | Glasebrook | June 14, 1955 |
| 2,768,968 | Reppe et al. | Oct. 30, 1956 |
| 2,805,248 | Friederick et al. | Sept. 3, 1957 |